(12) United States Patent
Wei et al.

(10) Patent No.: US 7,518,891 B2
(45) Date of Patent: Apr. 14, 2009

(54) AUXILIARY CIRCUIT FOR USE WITH THREE-PHASE DRIVE WITH CURRENT SOURCE INVERTER POWERING A SINGLE-PHASE LOAD

(75) Inventors: Lixiang Wei, Whitefish Bay, WI (US); Gary L. Skibinski, Milwaukee, WI (US); Richard A. Lukaszewski, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 303 days.

(21) Appl. No.: 11/461,693

(22) Filed: Aug. 1, 2006

(65) Prior Publication Data
US 2007/0030707 A1 Feb. 8, 2007

Related U.S. Application Data

(60) Provisional application No. 60/704,614, filed on Aug. 2, 2005.

(51) Int. Cl.
*H02M 1/12* (2006.01)
*H02M 7/00* (2006.01)

(52) U.S. Cl. .................. 363/41; 363/40; 363/123; 363/35

(58) Field of Classification Search ............. 363/41, 363/40, 123, 35
See application file for complete search history.

(56) References Cited

U.S. PATENT DOCUMENTS

| | | | |
|---|---|---|---|
| 3,746,963 A | 7/1973 | VeNard, II | |
| 4,545,002 A * | 10/1985 | Walker | 363/37 |
| 4,651,265 A | 3/1987 | Stacey et al. | |
| 4,689,735 A | 8/1987 | Young | |
| 4,935,860 A * | 6/1990 | Kirchberg et al. | 363/39 |
| 4,937,720 A * | 6/1990 | Kirchberg | 363/41 |
| 4,977,492 A | 12/1990 | Kirchberg, Jr. et al. | |
| 5,047,910 A | 9/1991 | Levran et al. | |
| 6,014,017 A | 1/2000 | Weinhold et al. | |
| 6,191,676 B1 | 2/2001 | Gabor | |
| 6,288,915 B1 | 9/2001 | Stemmler et al. | |
| 6,654,261 B2 * | 11/2003 | Welches et al. | 363/41 |
| 6,801,019 B2 * | 10/2004 | Haydock et al. | 322/17 |
| 6,995,992 B2 | 2/2006 | Wei et al. | |
| 7,221,062 B2 * | 5/2007 | Holl et al. | 307/10.1 |

OTHER PUBLICATIONS

Toshihisa Shimizu et al., A Unity Power Factor PWM Rectifier with DC Ripple Compensation, IEEE Transactions on Industrial Electronics, vol. 44, No. 4, Aug. 1997.

S. B. Dewan, et al. Steady-State Analysis of Static Single-Phase to Three-Phase Converters, 1981 IEEE, University of Toronto, Toronto, M5S 1A4 Ontario Canada.

(Continued)

*Primary Examiner*—Shawn Riley
(74) *Attorney, Agent, or Firm*—Quarles & Brady LLP; Alexander R. Kuszewski

(57) ABSTRACT

An auxiliary circuit for reducing low order current harmonics in a three-phase drive system driving a single-phase load, the three-phase drive system including a three-phase source voltage connected to a rectifier system connected to a DC link choke inductor connected to a three-phase current source inverter system.

22 Claims, 6 Drawing Sheets

OTHER PUBLICATIONS

Shahidul I. Kahn, et al., A Novel Single- to Three-Phase Static Converter, IEEE Transactions on Industry Applications, vol. 25, No. 1, Jan./Feb. 1989.

Francisco F. Zapata, et al., Analysis and Design of a Single-Phase PWM Current Source Rectifier with Neutral Lag, 1998 IEEE, Concepcion, Chile.

Makoto Saito, et al., A Single to Three Phase Matrix Converter with a Power Decupling (sic) Capability, 2004 35th Annual IEEE Power Electronics Specialists Conference, Aachen, Germany, 2004.

Koichi Tsuno, and Toshihisa Shimizu, et al., Optimization of the DC Ripple Energy Compensating Circuit on a Single-phase Voltage Source PWM Rectifier, 2004 35th Annual IEEE Power Electronics Specialists Conference, Aachen, Germany, 2004.

* cited by examiner

AUXILIARY CIRCUIT FOR USE WITH THREE-PHASE DRIVE WITH CURRENT SOURCE INVERTER POWERING A SINGLE-PHASE LOAD

CROSS-REFERENCE TO RELATED APPLICATIONS

This application claims the benefit of U.S. Provisional application 60/704,614 filed Aug. 2, 2005, hereby incorporated by reference.

STATEMENT REGARDING FEDERALLY SPONSORED RESEARCH OR DEVELOPMENT

Not applicable.

BACKGROUND OF THE INVENTION

The present invention relates generally to power conversion and conditioning and, more particularly, to an auxiliary circuit for reducing current harmonics from an unbalanced load.

Power plants are linked to power consuming facilities (e.g., buildings, factories) via utility grids designed so as to be extremely efficient in delivering massive amounts of power. To facilitate efficient distribution, power is delivered over long distances as low frequency three-phase AC current.

Despite being distributable efficiently, low frequency AC current is sometimes not suitable for end use in consuming facilities. Thus, prior to end use, power delivered by a utility has to be converted to a useable form. To this end, a typical power "conditioning" configuration includes an AC-to-DC rectifier that converts the utility AC power to DC across positive and negative DC buses (i.e., across a DC link) and an inverter linked to the DC link that converts the DC power back to three-phase AC power having an end-useable form (e.g., three-phase relatively high frequency AC voltage). A controller controls the inverter in a manner calculated to provide voltage waveforms required by the consuming facility.

Motors and their associated loads are one type of common inductive load employed at many consuming facilities. While the present invention is applicable to different load types, to simplify this explanation, an exemplary motor with an associated load will be assumed. To drive a motor, an inverter includes a plurality of switches that can be controlled to link and delink the positive and negative DC buses to motor supply lines. The linking/delinking sequence causes voltage pulses on the motor supply lines that together define alternating voltage waveforms. When controlled correctly, the waveforms cooperate to generate a rotating magnetic field inside a motor stator core. The magnetic field induces (hence the nomenclature "induction motor") a field in motor rotor windings. The rotor field is attracted to the rotating stator field and hence the rotor rotates within the stator core.

Generally, a three-phase current source inverter is used to drive a three-phase balanced load. Under this condition, the inverter itself generates only high order current harmonics to its DC link side. The average current flowing inside the DC link side is constant. This can dramatically reduce the ripple current of its DC link inductor. Thus, it is much easier for the drive to generate high quality input current waveforms using various topologies (e.g., multiple phase rectifier system, regenerative drive, passive and active filtering rectifier system). Typically, it is not a problem for a standard designed product to meet IEEE 519 current harmonics specifications under three-phase balanced load conditions.

However, it is not uncommon to use a three-phase inverter product to drive a single-phase load. This arrangement reduces the number of drive types that a user must stock and maintain. Under this condition, a large number of low order current harmonics are generated in the DC link. With these low order harmonics, a corresponding large number of low order current harmonics can be generated by the rectifier system. It is typically not possible to have a standard design inverter drive a one phase load and still meet IEEE 519 current harmonics specifications. Moreover, a significant amount of the current and voltage stresses are added to either the DC link or the line side components, thus reducing the reliability of the overall drive.

To this end, FIG. 1A illustrates the input current of a three-phase drive system driving a single-phase load, and FIG. 1B illustrates the input current of a three-phase drive system driving a conventional, three-phase load. Note the distortions in the input current evident in FIG. 1A when a single-phase load is driven. FIG. 2A illustrates the DC link current of a three-phase drive system driving a single-phase load, and FIG. 2B illustrates the DC link current of a three-phase drive system driving a conventional, three-phase load. Again notice the large amount of ripple voltage seen in the DC link current under single-phase load conditions. In addition to causing input current and DC link distortions, the low-order current associated with a single-phase load driven by a three-phase converter can cause stability problems in controlling the rectifier.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art.

BRIEF SUMMARY OF THE INVENTION

At least some embodiments of the present invention include an auxiliary circuit for reducing low order current harmonics in a three-phase drive system driving a single-phase load the three-phase drive system including a three-phase source voltage connected to a rectifier system connected to at least one DC link inductor connected to a three-phase current source inverter that supplies three-phase power. The auxiliary circuit can reduce low-order current harmonics to a level that complies with the IEEE 519 current harmonic specifications.

The auxiliary circuit may be an auxiliary capacitor and a filter capacitor, two auxiliary capacitors, or three auxiliary capacitors. The auxiliary circuit may be sized and designed for a specific combination of three-phase drive system and single-phase load. The auxiliary circuit may be sized that a rating of the three-phase current source inverter is minimized.

These and other objects, advantages and aspects of the invention will become apparent from the following description. The particular objects and advantages described herein may apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE SEVERAL VIEWS OF THE DRAWINGS

The invention will hereafter be described with reference to the accompanying drawings, wherein like reference numerals denote like elements, and.

Figure 1A:
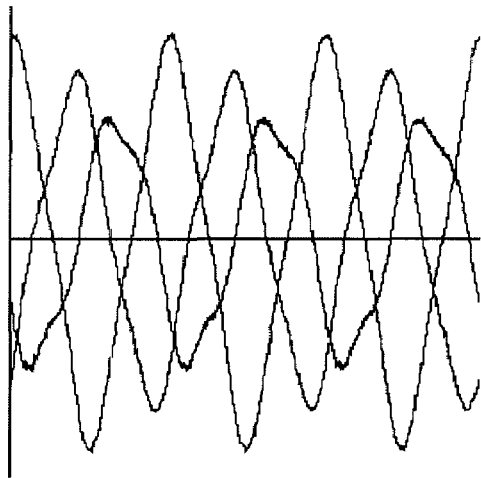
FIGS. 1A and 1B are graphs illustrating input current for a three-phase drive powering a single-phase load and a three-phase-load, respectively.
Figure 1B:
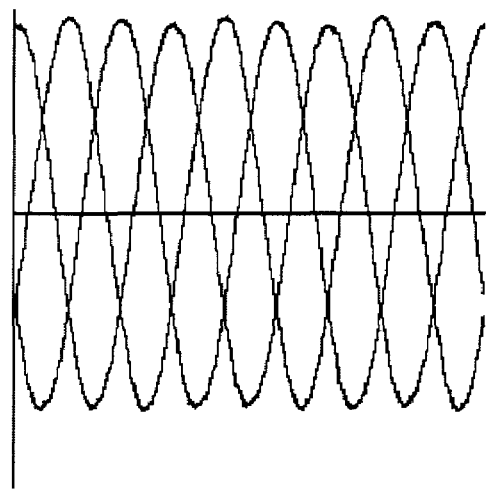
Figure 2A:
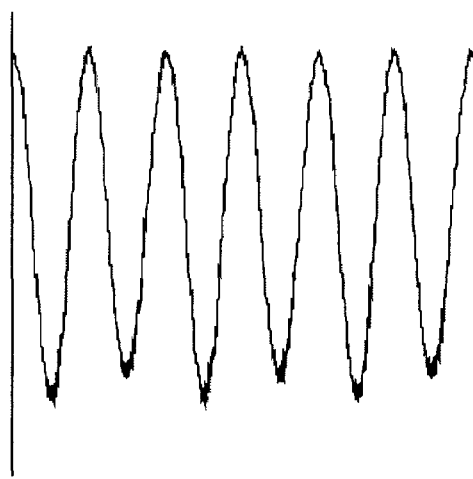
FIGS. 2A and 2B are graphs illustrating DC link current for a three-phase drive powering a single-phase load and a three-phase load, respectively.
Figure 2B:
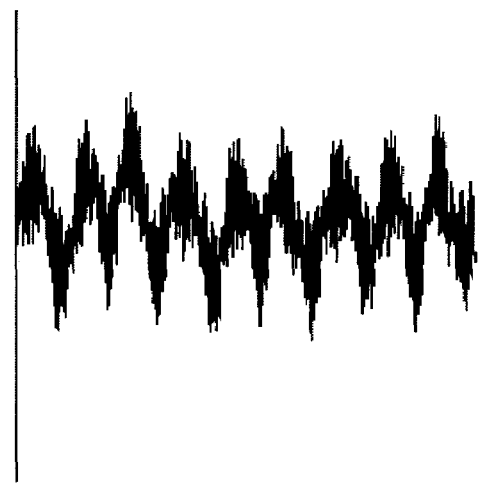

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One, or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the claims at the end of this specification. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Figure 3:
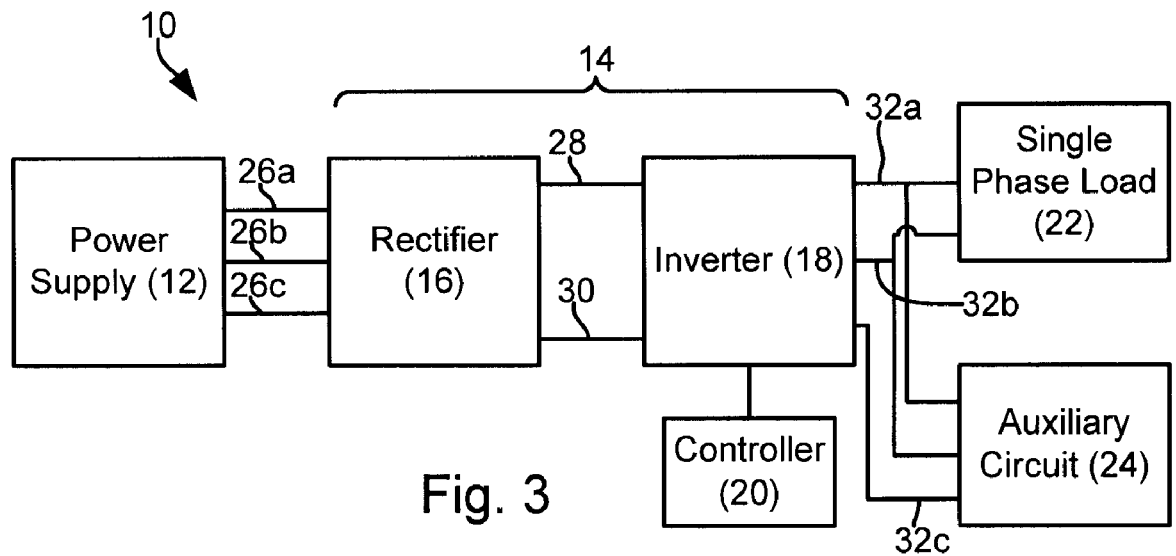
FIG. 3 is a simplified block diagram of a drive system in accordance with an embodiment of the present invention.

Referring now to the drawings wherein like reference numbers correspond to similar components throughout the several views and, specifically, referring to FIG. 3, the present invention shall be described in the context of a drive system 10. The drive system 10 includes a power supply 12, a drive unit 14, including a rectifier 16, an inverter 18, and a controller 20, a single-phase load 22 (e.g., a single-phase motor or heater), an auxiliary circuit 24, and a plurality of lines and buses that link the aforementioned components together in the manner described hereinafter.

Still referring to FIG. 3, power supply 12 provides three-phase AC voltage received to rectifier 16. The nominal line voltage of power supply 12 may vary depending on the particular implementation. Rectifier 16 receives three-phase power from power supply 12 over lines 26a, 26b, and 26c and converts the AC power to DC. Rectifier 16 provides the DC power to inverter 18 on positive and negative DC buses 28 and 30, respectively. There are various types of rectifiers 16 employed to convert the AC power to DC. Some rectifiers are passive and do not require input from a controller (e.g., controller 20). For example, a multiple phase (e.g., 6, 18, 24) diode rectifying bridge may be used in conjunction with at least one bus inductor, which can also be called a choke, and filter(s) to perform the rectifying function. A bus inductor (not shown) is also known as a DC link inductor because it is serially connected on a DC line connecting the rectifier to the inverter. There may be an inductor on both DC supply lines. Other types of rectifiers are active. For example, a pulse width modulated (PWM) rectifier includes a plurality of switching transistors controlled by controller 20 to generate the DC potential. Active PWM rectifiers are sometimes employed where energy present in load 22 (e.g., the motor windings) is regeneratively supplied back to the power supply 12 when load 22 is disconnected. In the passive rectifier case, such power may be dissipated in braking resistors coupled across load 22 when the load is disconnected.

Inverter 18 is positioned between positive and negative DC buses 28 and 30, respectively, of rectifier 16. Although not illustrated, as is well known in the motor control industry, inverter 18 includes a plurality of switching devices (e.g., BJT's, etc.) that are positioned between positive and negative DC buses 28 and 30 and supply lines 32a, 32b and 32c such that controller 20 can open and close specific combinations of the inverter switches to generate positive and negative DC voltage pulses on each of supply lines 32a, 32b and 32c. By opening and closing the inverter switches in specific sequences, motor drive 14 generates AC voltages having controllable amplitudes and frequencies on each of supply lines 32a, 32b and 32c so that supply lines 32a, 32b, and 32c carry currents with three different phases. Load 22 is connected to lines 32a and 32b and auxiliary circuit 24 is connected to lines 32a, 32b and 32c.

As is well known in the art, inverter 24 is a current source inverter. Typically, a current source inverter includes a diode in series with each of the switching devices. The current source inverter generally provides a smooth sinusoidal output. Current source inverters are typically employed for high voltage, high current applications (e.g., >1000V).

Auxiliary circuit 24 suppresses low-order harmonics caused by single-phase load 22 drawing power from the three-phase power supplied by drive unit 14. For example, uncompensated single-phase load 22 generates a large amount of low-order current harmonics on the DC link in between rectifier 16 and inverter 18. These harmonics can saturate a DC link inductor and damage inverter 18 diodes. An uncompensated single-phase load 22 can also heavily distort the input current waveform to drive 14 on the lines 26a, 26b and 26c so that it is not possible to meet some of the industrial standard harmonics specifications, such as IEEE 519. Additionally, an uncompensated single-phase load 22 can disrupt the control of a front end rectifier thus complicating the task of controlling the drive.

Figure 4:
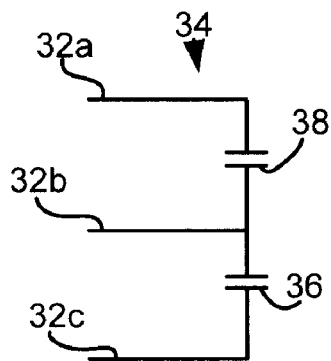
FIG. 4 is a schematic view of an auxiliary circuit in accordance with an embodiment of the present invention.
Figure 7:
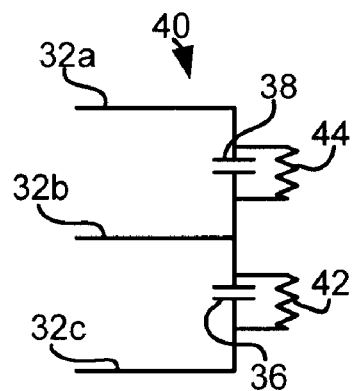
FIG. 7 is a schematic view of the auxiliary circuit of FIG. 4 with damping resistors.

Referring now to FIGS. 4 and 7, in accordance with a first embodiment of the invention, an auxiliary circuit 34 includes an auxiliary capacitor 36 connected to lines 32b and 32c. Auxiliary circuit 34 can further include a filter capacitor 38 connected to lines 32a and 32b (the same lines to which the single-phase load is connected). Auxiliary capacitor 36 and filter capacitor 38 may be paralleled with damping resistors 42 and 44 to form an auxiliary circuit 40 (see FIG. 7). Auxiliary circuits 34 and 40 are configured to compensate for single-phase load 22 driven by three-phase drive system 10 (as shown in FIG. 3). Capacitors 36 and 38 can be sized and configured to smooth out the PWM current generated by three-phase current source inverter 18. Damping resistors 42 and 44 can be sized and configured so as to dampen any unwanted harmonics and/or oscillations. The determination and calculation of the sizing of capacitors 36 and 38 will be discussed hereinafter.

Auxiliary circuit 34 can be designed and sized using the hereinafter discussed set of derived equations. Auxiliary circuit 40 can be similarly designed and sized. Referring again to FIG. 3, in deriving the following equations, single-phase load 22 is assumed to comprise an inductor $L_o$ and resister $R_o$. By neglecting the high frequency component, the fundamental component of the load terminal current $i_o(t)$ and voltage $V_o(t)$ can be expressed as:

$$i_o(t) = I_m \cdot \cos(\omega t)$$

$$V_o(t) = V_m \cdot \cos(\omega t - \phi) \quad (1)$$

where $V_m$ and $I_m$ are the amplitude of the load voltage and current, respectively, $\omega$ is the angular speed of single-phase load 22, and $\phi$ is the power factor angle of single-phase load 22. Based on the fundamental components of the load terminal voltage and current, the instantaneous active power flowing into single-phase load 22 can be expressed as:

$$P_o(t) = V_o(t) \cdot i_o(t) = \frac{V_m I_m}{2}[\cos\phi + \cos(2\omega t - \varphi)] \quad (2)$$

If there is no auxiliary circuit 34 connected to inverter 18, the DC link voltage generated by single-phase load 22 can be expressed as:

$$V_{dc,1}(t) = \frac{P_o(t)}{I_{dc}} = \frac{V_m I_m}{2I_{dc}}[\cos\varphi + \cos(2\omega t - \varphi)] \quad (3)$$

where $V_{dc,1}(t)$ is the DC link voltage on the inverter side caused by single-phase load 22 directly and $I_{dc}$ is the DC link current. Equation (3) demonstrates that a large amount of low-order harmonics voltage exist in the DC link current. If the DC inductance is not large enough, ripple current to the DC link choke is generated thereby causing two problems. First, the DC choke can become saturated and the temperature of the choke will increase dramatically. Second, input current waveforms become much worse than in the three-phase balanced condition.

To prevent problems associated with single-phase load 22 being driven by three-phase drive 14, auxiliary circuit 34 can cancel out the harmonic current caused by load 22. Generally, the auxiliary circuit current $i_{au}(t)$ and voltage $V_{au}(t)$ can be expressed as:

$$i_{au}(t) = I_{am} \cdot \cos(\omega t - \theta)$$

$$V_{au}(t) = V_{am} \cdot \cos(\omega t - \theta - \phi_{au}) \quad (4)$$

where $I_{am}$ and $V_{am}$ are the amplitudes of the auxiliary circuit current and voltage, respectively, $\theta$ is the angle difference between the load current and the auxiliary circuit current, and $\phi_{au}$ is the angle difference between auxiliary circuit voltage and current. Generally, $\phi_{au}$ is close to $-\pi/2$ for a capacitor. Based on Equation (4), the instantaneously active power flowing into auxiliary circuit 34 can be expressed as:

$$P_{au}(t) = V_{au}(t) \cdot i_{au}(t) = \frac{V_{am}I_{am}}{2}\cos(2\omega t - 2\theta - \varphi_{au}) \quad (5)$$

and then the DC link voltage generated by auxiliary circuit 34 can be expressed as:

$$V_{dc,2}(t) = \frac{P_{au}(t)}{I_{dc}} = \frac{V_{am}I_{am}}{2I_{dc}}\cos(2\omega t - 2\theta - \varphi_{au}) \quad (6)$$

where $I_{dc}$ is the DC link current caused by auxiliary circuit 34. The following equation can be derived from Equations (3) and (6) and can be used to cancel out the low order DC link current harmonics caused by single-phase load 22:

$$\frac{V_{am}I_{am}}{2V_{dc}}\cos(2\omega t - 2\theta - \varphi_{au}) = -\frac{V_m I_m}{2V_{dc}}\cos(2\omega t - \varphi) \quad (7)$$

From Equation (7) the following equations can be derived:

$$V_{am}I_{am} = V_m I_m \quad (8)$$

$$\theta = \frac{\varphi}{2} - \frac{\varphi_{au}}{2} \pm \frac{\pi}{2}$$

Equations (8) can be used to calculate the size of auxiliary circuit 34 so that the circuit will compensate for low-order current harmonics caused by a particular single-phase load 22 driven by a three-phase drive 14. Auxiliary circuit 34 can be sized to cancel out the low-order current harmonics caused by load 22 so that the input current waveform of drive 14 can be generally the same as the input current waveform of a drive with a three-phase load.

One drawback of using three-phase inverter 18 to drive single-phase load 22 is that inverter 18 must have an increased rating. In order to design auxiliary circuit 34 so that the rating of inverter 18 is minimized, the following boundary conditions should be considered: 1) the terminal voltages of single-phase load 22 and auxiliary circuit 34 should not be over-modulated; 2) the currents of the three phases on supply lines 32a, 32b, and 32c should be minimized for the overall operating condition of inverter 18; and 3) filter capacitor 36 can be neglected because its impedance is much higher than the impedance of load 22. From the hereinbefore discussion of auxiliary circuit 34, it should be appreciated that the auxiliary circuit conductance $Y_{au}$ the angle difference between the voltage and current of auxiliary circuit 34 can be expressed as:

$$|Y_{au}| = \frac{I_{am}}{V_{am}} = \omega C_{au} \quad \varphi_{au} = \frac{\pi}{2} \tag{9}$$

The first step in sizing auxiliary circuit 34 is determining the optimum angle difference between the current of auxiliary circuit 34 and the current of load 22. Equation (8) shows that there are two solutions to cancel out the low-order current harmonics. These two solutions provide the same voltage ratings for both load 22 and auxiliary circuit 34. The optimum solution can be determined by comparing the voltage ratings of the voltage between the phase on supply line 32a and the phase on supply line 32c. By combining Equations (4) and (8), the current waveforms of auxiliary circuit 34 can be expressed as:

$$V_{au}(t) = V_{am} \cdot \cos(\omega t - \theta - \varphi_{au}) = V_{am}\cos\left(\omega t - \frac{\varphi + \varphi_{au} \mp \pi}{2}\right) \tag{10}$$

then the voltage between the phase on supply line 32a and the phase on supply line 32c can be expressed as:

$$V_{a-c}(t) = V_{au}(t) - V_o(t) \tag{11}$$
$$= V_{am}\cos\left(\omega t - \frac{\varphi + \varphi_{au} \mp \pi}{2}\right) - V_m\cos(\omega t - \varphi)$$

To allow for the minimum rating of drive 14, the angle difference between $V_{au}$ and $V_o$ should be close to 0 in Equation (11):

$$|\angle V_{au} - \angle V_o| = \left|\frac{\varphi + \varphi_{au} \mp \pi}{2}\right| \tag{12}$$

For example, for a capacitive load such as auxiliary circuit 34, when the voltage angle lags the load current angle $\phi \in \{0, \pi/4\}$, the following equation can be observed from Equation (12):

$$|\angle i_{au} - \angle i_o| \in \left\{\frac{3\pi}{4}, \frac{7\pi}{8}\right\} \quad \text{if } \theta = \frac{\varphi}{2} - \frac{\varphi_{au}}{2} + \frac{\pi}{2} \tag{13}$$

$$|\angle i_{au} - \angle i_o| \in \left\{\frac{9\pi}{8}, \frac{5\pi}{4}\right\} \quad \text{if } \theta = \frac{\varphi}{2} - \frac{\varphi_{au}}{2} - \frac{\pi}{2} \tag{14}$$

Equation (13) is the better solution because it closes to 0; therefore, it tends to generate lower voltage ratings between the phase on supply line 32a and the phase on supply line 32c.

The next step in designing auxiliary circuit 34 is determining the capacitance of capacitor 36. To compensate the circuit for varying working conditions, the terminal voltage and current angle of auxiliary circuit 34 can meet the following conditions expressed as:

$$C_{au} = \frac{I_{am}}{\omega V_{am}} = \frac{I_{am}^2}{\omega V_{am} I_{am}} \geq \frac{1}{\omega V_m I_m} \cdot I_{o\max}^2 = C_{au,\min} \tag{15}$$

In Equation (15), $\omega V_m I_m$ is mainly determined by the characteristics of single-phase load 22. $I_{o\ max}$ is the maximum allowable current of auxiliary circuit 34, $I_{o\ max}$ is determined by the DC bus current (the current on lines 28 and 30), current $I_m$ of load 22, and angle $\theta$. Generally, the capacitance of capacitor 36 of auxiliary circuit 34 can be set as $C_{au,min}$ in order to minimize both the current rating of inverter 18 and the capacitance.

The third step in designing auxiliary circuit 34 is determining its voltage rating. Once the capacitance of capacitor 36 of auxiliary circuit 34 is determined, the voltage rating of auxiliary circuit 34 can be calculated as:

$$V_{am} = \sqrt{\omega C_{au} I_{am} V_{am}} = \sqrt{\omega C_{au} I_m V_m} \leq \max(\sqrt{\omega V_m I_m}) \cdot \sqrt{C_{au}} \tag{16}$$

Equation (16) shows that the voltage ratings of auxiliary circuit 34 is determined by the selected capacitance $C_{au}$ and maximum load $\omega V_m I_m$.

The final step in designing auxiliary circuit 34 is determining the maximum voltage ratings of three-phase supply lines 32a, 32b, and 32c from inverter 18 in order to verify the safety of the voltage rating of inverter 18 and of capacitors 36 and 38 of auxiliary circuit 24. The maximum voltage rating of the phase on supply line 32b (the phase to which load 22 and capacitor 36 are both connected) can be determined by combining Equations (13), (15), and (16). The voltage rating of inverter 18, capacitor 36, and filter capacitor 38 can then be checked for safety purposes.

Figure 5:
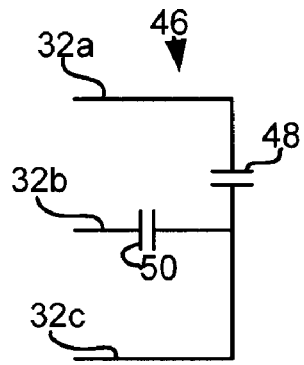
FIG. 5 is a schematic view of an auxiliary circuit in accordance with an embodiment of the present invention.
Figure 8:
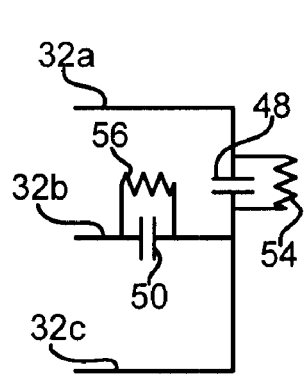
FIG. 8 is a schematic view of the auxiliary circuit of FIG. 5 with damping resistors.

Referring now to FIG. 5, in accordance with a second embodiment of the invention, an auxiliary circuit 46 includes a first auxiliary capacitor 48 connected to supply lines 32a and 32c, and a second auxiliary capacitor 50 connected to supply lines 32b and 32c. As discussed hereinabove, single-phase load 22 is connected between supply lines 32a and 32b. First and second auxiliary capacitors 48 and 50 can be paralleled with damping resistors to form an auxiliary circuit 52 as shown in FIG. 8. Auxiliary circuit 52 includes a first auxiliary capacitor 48 and a parallel resistor 54 connected between supply lines 32a and 32c, and a second auxiliary capacitor 50 and a parallel resistor 56 connected between supply lines 32b and 32c. Design and sizing of first and second auxiliary capacitors 48 and 50 will be discussed hereinafter. Damping resistors 54 and 56 can be sized and configured so as to dampen any unwanted harmonics and/or oscillations.

Figure 6:
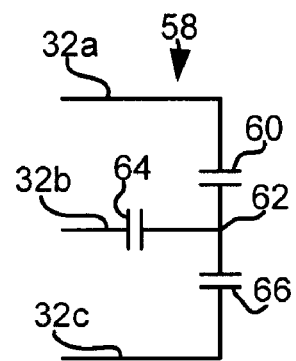
FIG. 6 is a schematic view of an auxiliary circuit in accordance with an embodiment of the present invention.
Figure 9:
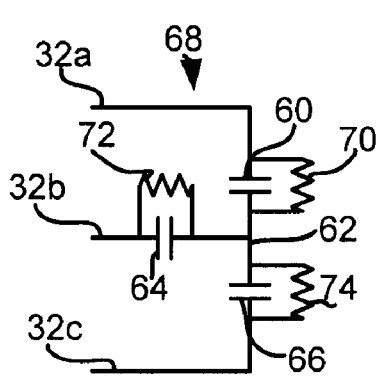
FIG. 9 is a schematic view of the auxiliary circuit of FIG. 4 with damping resistors.

Referring now to FIG. 6, in accordance with a third embodiment of the invention, an auxiliary circuit 58 includes a first auxiliary capacitor 60 connected between supply line 32a and an auxiliary line 62, a second auxiliary capacitor 64 connected between supply line 32b and auxiliary line 62 and a third auxiliary capacitor 66 connected between supply line 32c and auxiliary line 62. As discussed hereinabove, single-phase load 22 is connected between supply lines 32a and 32b. Auxiliary capacitors 60, 64, and 66 can be paralleled with damping resistors 70, 72, and 74, respectively, to form an auxiliary circuit 68 as illustrated in FIG. 9. Design and sizing of the first, second and third auxiliary capacitors 60, 64, and 66 will be discussed hereinafter. Damping resistors 70, 72 and 74 can be sized and configured so as to dampen any unwanted harmonics and/or oscillations.

The design and sizing of auxiliary circuit 58 can be simplified similarly to the design and sizing of auxiliary circuit 34 by analyzing auxiliary circuit 58 as an simplification of auxiliary circuit 34, and then by designing and sizing the simplified circuit as auxiliary circuit 34 is designed and sized above. Auxiliary circuit 46 can be treated as an equivalent to auxiliary circuit 58 with third auxiliary capacitor 66 set to infinity.

Figure 10A:
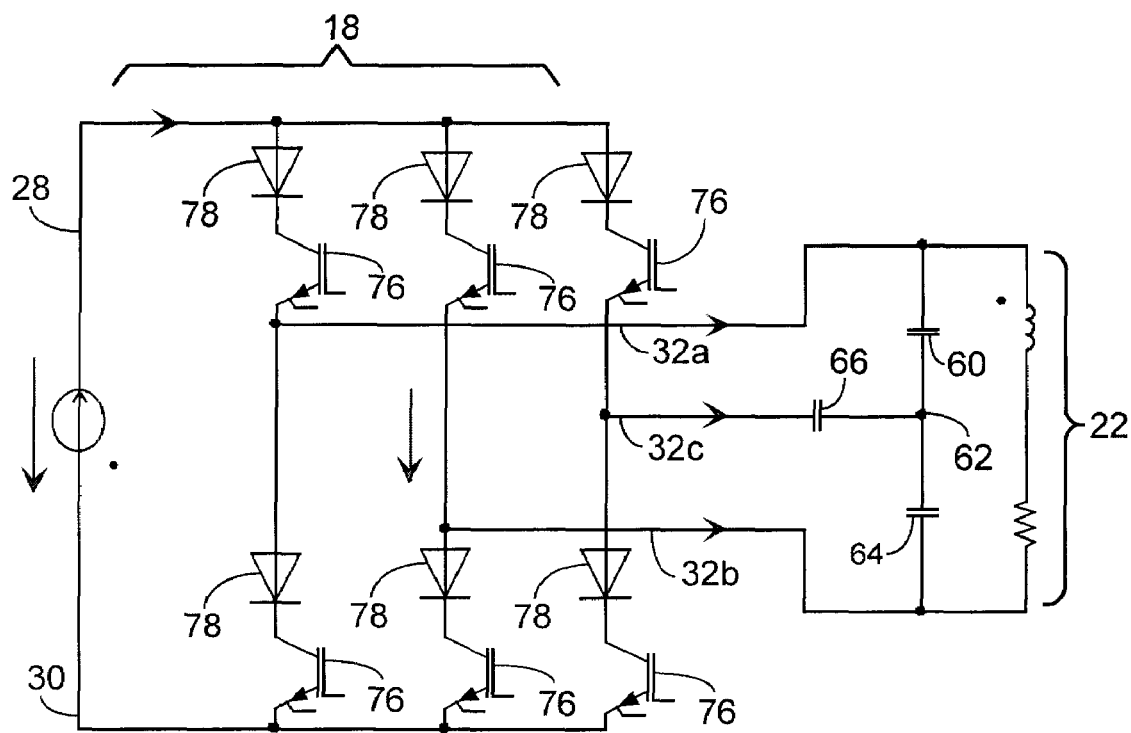
FIGS. 10A through 10D are schematic views of circuits of an inverter of a drive system with the auxiliary circuit of FIG. 6.

FIG. 10A shows the drive side of a circuit 75 with inverter 18 driving single-phase load 22 and with auxiliary circuit 58 connected to compensate for low-order harmonics caused by load 22. Inverter 18 has gate-controlled switches 76 that are connected in pairs across DC buses 28 and 30, with the junction between each pair of switches being connected to one of supply lines 32a, 32b, and 32c. Switches 76 are each in series with a diode 78. Load 22 is connected to lines 32a and 32b. First auxiliary capacitor 60 is connected to supply line 32a and to auxiliary line 62. Second auxiliary capacitor 64 is connected to supply line 32b and auxiliary line 62. Third auxiliary capacitor 66 is connected to supply line 32c and auxiliary line 62. The first step in transforming auxiliary circuit 58 into a simplification of auxiliary circuit 34 is characterizing the command currents on supply lines 32a, 32b and 32c of circuit 58 with the following equations:

$$i_{phase=a}(t) = i_o(t) - \frac{1}{2}i_{au}(t) \quad (17)$$
$$i_{phase-b}(t) = -i_o(t) - \frac{1}{2}i_{au}(t)$$
$$i_{au}(t) = -i_{phase-a}(t) - i_b(t)$$

where $i_{phase=a}(t)$ is the command current on line 32a, $i_{phase=b}(t)$ is the command current on line 32b, $i_o(t)$ can be regarded as the load current that flows into single-phase load 22 and auxiliary capacitors 60 and 64 (which are connected to supply lines 32a and 32b, the lines to which the single-phase load 22 is connected), and $i_{au}(t)$ is the current command circulating among the three auxiliary capacitors 60, 64, and 66. $i_o(t)$ and $i_{au}(t)$ are assumed to be:

$$i_o(t) = I_m \cos(\omega t)$$
$$i_{au}(t) = I_{am} \cos(\omega t - \theta) \quad (18)$$

where $I_m$ is the amplitude of the load current, $\omega$ is the angular speed of single-phase load 22, $I_{am}$ is the amplitude of the auxiliary circuit current and $\theta$ is the angle difference between the load current and the auxiliary circuit current.

Figure 10B:
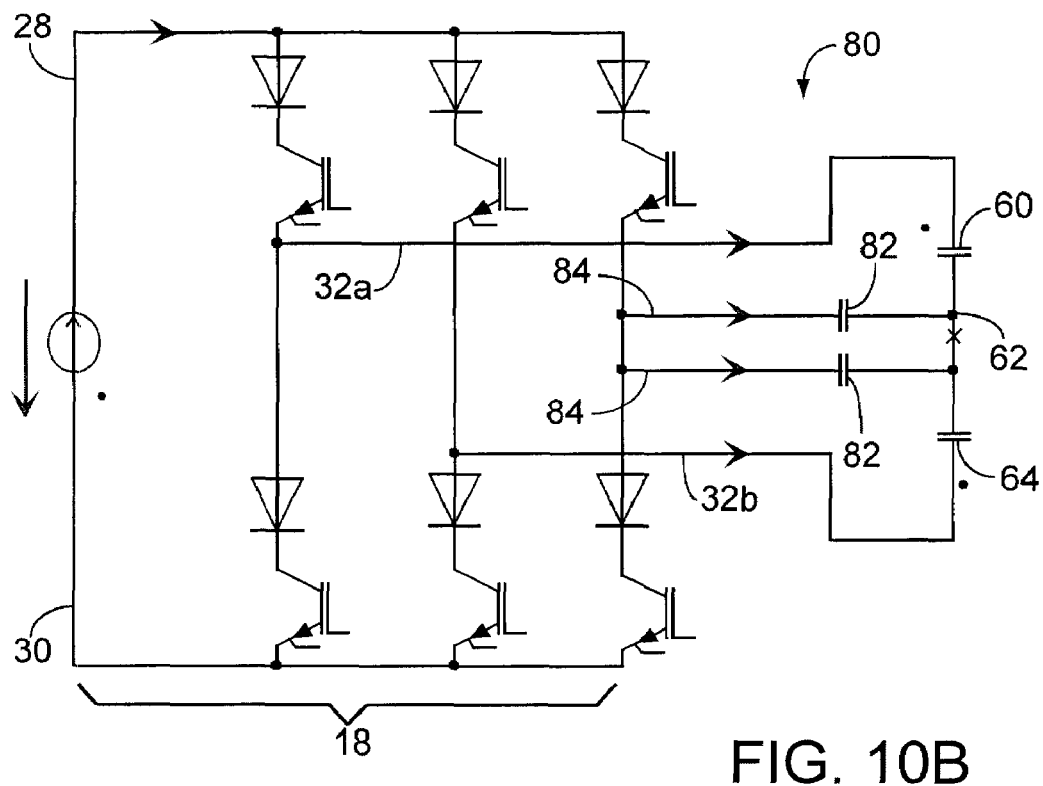
Figure 10C:
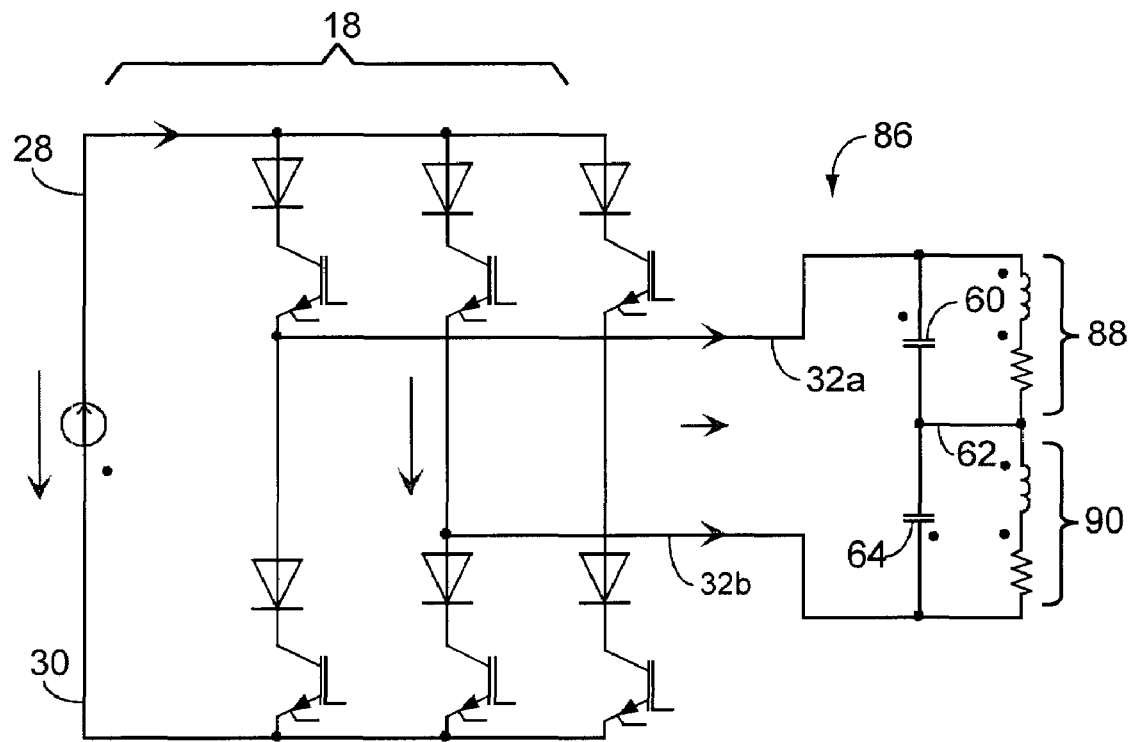

FIG. 10A can be separated into two simplified circuits as shown in FIGS. 10B and 10C. FIG. 10B shows the drive side of a first simplified circuit 80 derived from Equation (18) by setting $i_o(t)=0$. In first simplified circuit 80, third auxiliary capacitor 66 of circuit 75 has been divided into two identical simplified third auxiliary capacitors 82 that are connected in parallel on simplified third capacitor auxiliary lines 84 between supply line 32c and auxiliary line 62. The simplified third auxiliary capacitors 82 have a capacitance that is half of the capacitance of third auxiliary capacitor 66. First auxiliary capacitor 60 is connected between supply line 32a and auxiliary line 62. Second auxiliary capacitor 64 is connected between supply line 32b and auxiliary line 62. The currents of first simplified circuit 80 can be expressed as:

$$i_{phase=a}(t) = -\frac{1}{2}i_{au}(t) \quad (19)$$
$$i_{phase-b}(t) = -\frac{1}{2}i_{au}(t)$$
$$i_{equivalent\_au}(t) = \frac{1}{2}i_{au}(t)$$

where $i_{equivalent\_au}(t)$ is the current on simplified third capacitor auxiliary lines 84. Then, from first simplified circuit 80, the line voltage can be calculated as:

$$V_{ac,2}(t) = V_{bc,2}(t) = -|Z_{au}|I_{am}\sin(\omega t - \theta + \angle Z_{au}) \quad (20)$$
$$V_{ab}(t) = 0$$
$$Z_{au} = \frac{2}{j\omega C_{au3}} + \frac{1}{j\omega C_{au}}$$

where $V_{ac,2}(t)$ is the voltage between supply lines 32a and 32c of first simplified circuit 80, $V_{bc,2}(t)$ is the voltage between supply lines 32b and 32c of first simplified circuit 80, and $V_{ab}(t)$ is the voltage between supply lines 32a and 32b of first simplified circuit 80. $Z_{au}$ is the impedance of the simplified auxiliary circuit of first simplified circuit 80 that equals a series connection of two capacitors. $C_{au3}$ is the capacitance of third auxiliary capacitor 66. The capacitance of first auxiliary capacitor 60 is equal to the capacitance of the second auxiliary capacitor 64, the capacitance of capacitors 60 and 64 being $C_{au}$. The active power generated by auxiliary circuit 58 can then be derived from Equations (18) and (20).

FIG. 10C shows the drive side of a second simplified circuit 86 derived when $i_{au}(t)=0$. In second simplified circuit 86, first auxiliary capacitor 60 is connected between supply line 32a and auxiliary line 62, and second auxiliary capacitor 64 is connected between supply line 32b and auxiliary line 62. Load 22 has been split into two simplified loads 88 and 90 that are equal to half the impedance of load 22 (half the inductance of inductor $L_o$ of load 22 and half the resistance of resister $R_o$ of load 22). Simplified load 88 is connected between supply line 32a and auxiliary line 62 and simplified load 90 is connected between supply line 32b and auxiliary line 62. The current on supply line 32b is the inverse of the current on supply line 32a. From second simplified circuit 88, the output voltage between supply lines 32a and 32b can be calculated as:

$$V_{ab,1}(t) = 2|Z_{oau}|I_m\cos(\omega t - \angle Z_{oau}) \quad (21)$$
$$Z_{oau} = \frac{1}{j\omega C_{au}} // \left(\frac{j\omega L_o}{2} + \frac{R_o}{2}\right)$$

Where $V_{ab,1}(t)$ is the line voltage generated by the load current directly and $Z_{oau}$ is the simplified load impedance that is calculated by paralleling the capacitance $C_{au}$ of one auxiliary capacitor with half of the impedance of load 22.

Figure 10D:
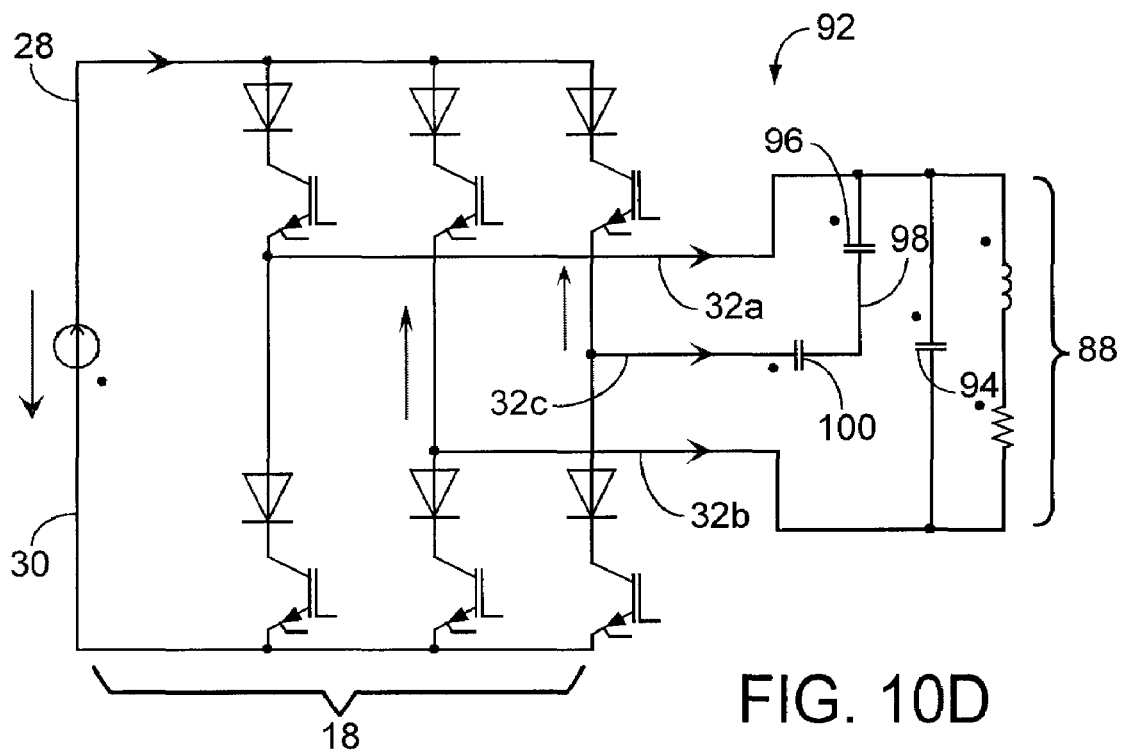

FIG. 10D shows the drive side of a third simplified circuit 92 derived by combining first simplified circuit 80 and second simplified circuit 86. Third simplified circuit 92 is the three-auxiliary-capacitor auxiliary circuit simplified to one-auxiliary-capacitor auxiliary circuit 34 (i.e., third simplified circuit 92 shows circuit 58 of FIG. 6 in an simplified form of circuit 34 of FIG. 4). In third simplified circuit 92, simplified load 88 is connected between supply lines 32a and 32b and is equal to half the impedance of load 22. A first simplified auxiliary capacitor 94 is connected between supply lines 32a and 32b.

A second simplified auxiliary capacitor 96 is connected between supply line 32a and an simplified auxiliary line 98. A third simplified auxiliary capacitor 100 is connected between supply line 32c and simplified auxiliary line 94. First simplified capacitor 94 and second simplified capacitor 96 have capacitances that are equal to capacitance $C_{au}$ of auxiliary capacitors 60 and 64. Third simplified capacitor 100 has a capacitance that is equal to one-half of capacitance $C_{au3}$ of third auxiliary capacitor 66. The voltage between DC buses 28 and 30 of third simplified circuit 92 is equal to half the voltage between DC buses 28 and 30 of first simplified circuit 75. The load impedance of circuit 92 can be derived by paralleling $C_{au}$ with the impedance of simplified load 88, which is equal to half of the impedance of load 22. The impedance of the auxiliary circuit of the simplified circuit 92 can be simplified as a series connection of 0.5 $C_{au3}$ and $C_{au}$. Then, the current and voltage of third simplified circuit 92 can be defined as Load Current: $i^*_{phase-b}(t) = i_{phase-b,1}(t) - i_o(t) = -I_m \cos(\omega t)$ (22)

Load voltage: $V^*_{ab} = V_{ab,1}(t) = 2|Z_{oau}|I_m \cos(\omega t - \angle Z_{oau})$ Auxiliary leg current: $i^*_{au}(t) = \dfrac{i_{au}(t)}{2}$ Auxiliary leg voltage: $V^*_{ca}(t) = V_{ca,2}(t) = -|Z_{au}|I_{am}\sin(\omega t - \theta + \angle Z_{au})$ Equation (22) can be used to design and size auxiliary circuit 58 similar to the design and sizing described hereinabove for auxiliary circuit 34. Auxiliary circuit 46 can be analyzed as a special case of auxiliary circuit 58 where $C_{au3}$ is set to infinity. Thus, auxiliary circuit 46 can be designed and sized according to Equation (22) in a manner similar to design and sizing of auxiliary circuit 58.

Figure 11:
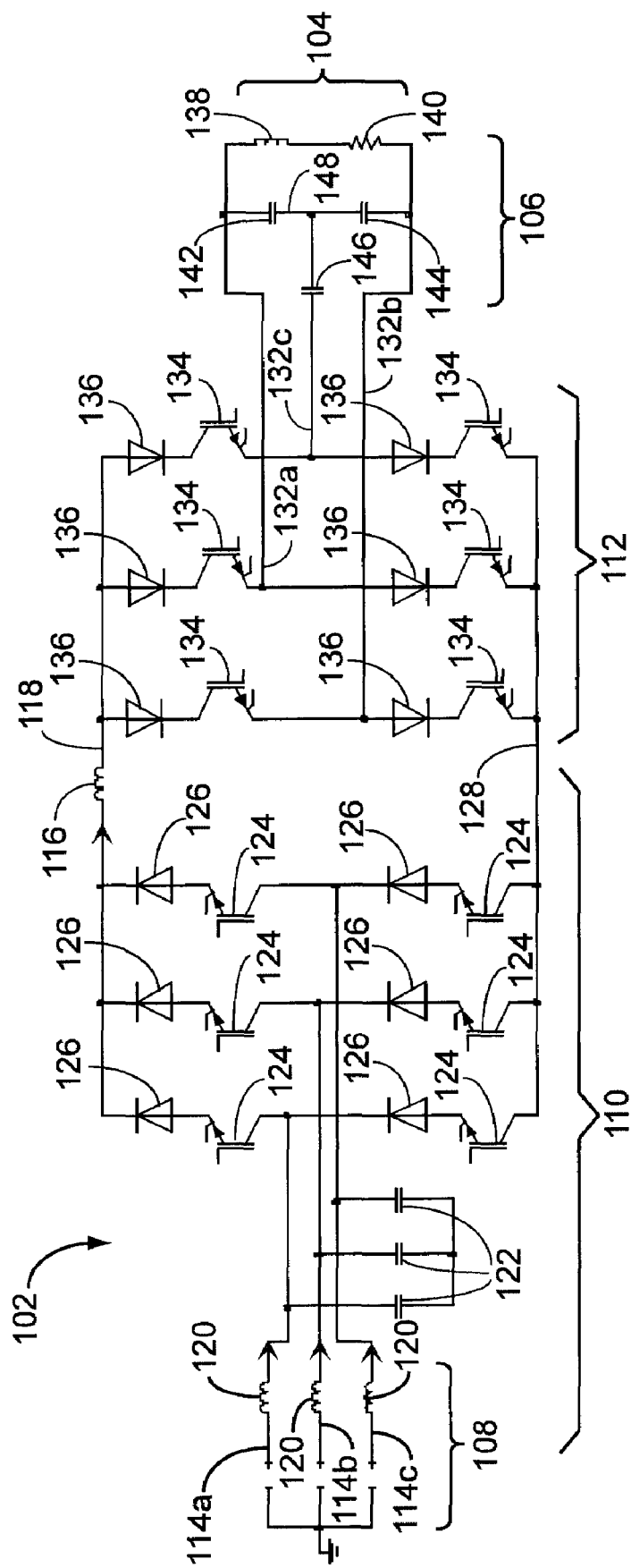
FIG. 11 is a schematic view of a drive system employing the auxiliary circuit of FIG. 6.

FIG. 11 is a schematic illustrating an exemplary system used to simulate the consequences of using and not using one inventive auxiliary circuit consistent with the FIG. 6 embodiment. FIGS. 12A-12F show operational results with and without the auxiliary circuit. FIG. 11 shows a drive system 102 providing three-phase power to a single-phase load 104, an auxiliary circuit 106 reducing the negative effects caused by the drive 102 providing power to single-phase load 104. Drive 102 includes a power supply 108, rectifier 110, and inverter 112. Power supply 108 provides a three-phase AC voltage received from the utility grid on lines 114a, 114b and 114c. Rectifier 110 receives the three-phase power over lines 114a, 114b and 114c and coverts the AC power to DC. Rectifier 110, shown as an active-front rectifier, includes a DC link choke inductor 116 connected in serial with a first DC bus 118. The rectifier further includes a plurality of inductors 120, capacitors 122, switching devices 124, and diodes 126 connected by a plurality of lines and buses. The switching devices 124 are controlled to generate the DC potential between first DC bus 118 and a second DC bus 128. DC buses 118 and 128 are connected to inverter 112. Inverter 112 provides three-phase power on supply lines 132a, 132b, and 132c by controlling a plurality of switching devices 134 connected in serial with a plurality of diodes 136 and between DC buses 118 and 128 and supply lines 132a, 132b, and 132c. The controllers of rectifier 110 and inverter 112 are not shown. Load 104 is connected between supply lines 132a and 132b and includes an inductor 138 and a resistor 140. Auxiliary circuit 106 includes a first auxiliary capacitor 142, a second auxiliary capacitor 144 and a third auxiliary capacitor 146.

First auxiliary capacitor 142 is connected between supply line 132a and an auxiliary line 148. Second auxiliary capacitor 144 is connected between supply line 132b and auxiliary line 148. Third auxiliary capacitor 146 is connected between supply line 132c and auxiliary line 148. The capacitors 142, 144, and 146 are identically sized.

Figure 12A:
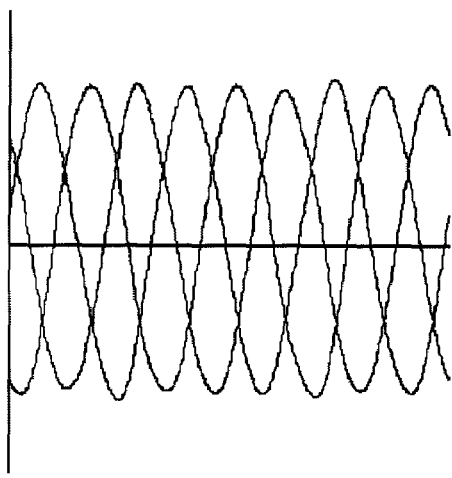
FIGS. 12A and 12B are graphs illustrating input currents for a three-phase drive powering a single-phase load with an auxiliary circuit and without an auxiliary circuit, respectively.
Figure 12B:
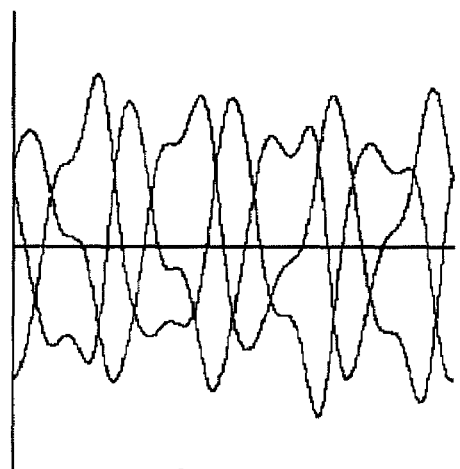
Figure 12C:
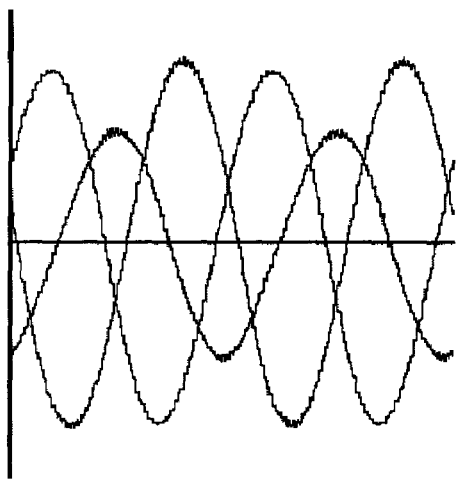
FIGS. 12C and 12D are graphs illustrating output voltages for a three-phase drive powering a, single-phase load with an auxiliary circuit and without an auxiliary circuit, respectively.
Figure 12D:
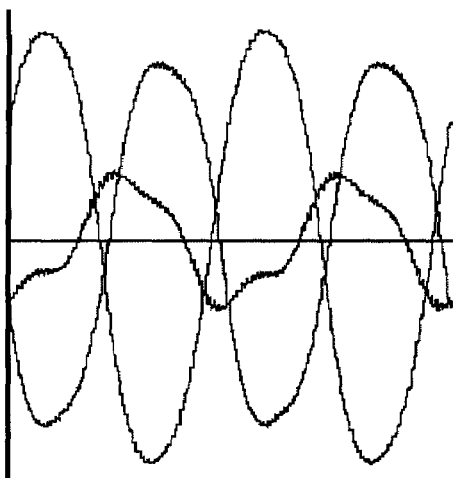
Figure 12E:
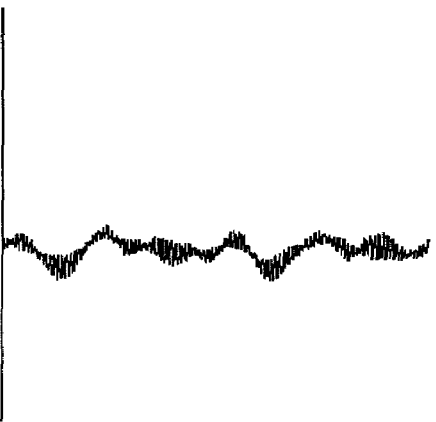
FIGS. 12E and 12F are graphs illustrating DC link current for a three-phase drive powering a single-phase load with an auxiliary circuit and without an auxiliary circuit, respectively.
Figure 12F:
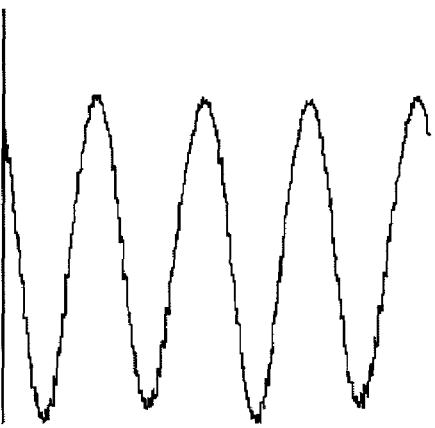

The benefits of using compensator 106 are illustrated in FIGS. 12A through 12F. FIG. 12A illustrates the input current on lines 114a, 114b and 114c when auxiliary circuit 106 is used. FIG. 12B illustrates the input current on lines 114a, 114b, and 114c when an auxiliary circuit is not used. Note the improvement of the input current when an auxiliary circuit is used. FIG. 12C illustrates the output voltages on supply lines 132a, 132b, and 132c when auxiliary circuit 106 is used. FIG. 12D illustrates the output voltages on supply lines 132a, 132b, and 132c when an auxiliary circuit is not used. Note that auxiliary circuit 106 improves the output voltages so that the output voltages are sinusoidal instead of distorted. FIG. 12E illustrates the DC link current DC link choke inductor 116 when auxiliary circuit 106 is used. FIG. 12F illustrates the DC link current DC link choke inductor 116 when an auxiliary circuit is not used. Note that auxiliary circuit 106 eliminates the large peak-to-peak ripple current in DC choke 116.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A system for reducing low order current harmonics in a three-phase drive system receiving a three-phase source voltage and driving an unbalanced load, the system comprising:
 a rectifier system connected to the three-phase source voltage;
 at least one DC link inductor connected to the rectifier system;
 a three-phase current source inverter connected to the at least one DC link inductor and supplying a first phase, a second phase, and a third phase;
 a single-phase load connected between the first phase and the second phase; and
 an auxiliary circuit connected to the first, second, and third phases.

2. The system of claim 1, wherein the auxiliary circuit comprises an auxiliary capacitor connected between the second and third phases and a filter capacitor connected between the first and second phases.

3. The system of claim 2, wherein the auxiliary capacitor and filter capacitor are sized so that a DC link current caused by the auxiliary circuit substantially cancels out a DC link current caused by the single-phase load.

4. The system of claim 3, wherein the auxiliary capacitor and filter capacitor are sized so that to smooth out a PWM current generated by the three- phase current source inverter.

5. The system of claim 3, wherein the auxiliary circuit further comprises a first damping resistor connected in parallel with the auxiliary capacitor and a second damping resistor connected in parallel with the filter capacitor.

6. The system of claim 1, wherein the following set of equations is used to design the auxiliary circuit:

$$V_{am}I_{am} = V_m I_m$$

$$\theta = \frac{\varphi}{2} - \frac{\varphi_{au}}{2} \pm \frac{\pi}{2}$$

$$|\angle V_{au} - \angle V_o| = \left|\frac{\varphi + \varphi_{au} \mp \pi}{2}\right|$$

$$C_{au} = \frac{I_{am}}{\omega V_{am}} = \frac{I_{am}^2}{\omega V_{am} I_{am}} \geq \frac{1}{\omega V_m I_m} \cdot I_{o\max}^2 = C_{au,\min}$$

$$V_{am} = \sqrt{\omega C_{au} I_{am} V_{am}} = \sqrt{\omega C_{au} I_m V_m} \leq \max\left(\sqrt{\omega V_m I_m}\right) \cdot \sqrt{C_{au}}$$

where $V_{am}$ is an amplitude of an auxiliary circuit voltage, $I_{am}$ is an amplitude of an auxiliary circuit current, $V_m$ an amplitude of a single-phase load voltage, $I_m$ is an amplitude of a single-phase load current, $\theta$ is an angle difference between the single-phase load current and the auxiliary circuit voltage, $\varphi$ is a power factor angle between the single-phase load voltage and current, $\varphi_{au}$ is a power factor angle between the auxiliary circuit voltage and current, $V_{au}$ is an auxiliary circuit voltage, $V_o$ is a single-phase load voltage, $C_{au}$ is an auxiliary circuit capacitance, $C_{au,min}$ is a maximum auxiliary circuit capacitance, $\omega$ is a single-phase load angular speed, $I_{o\ max}$ is a maximum single-phase load current and $C_{au,min}$ is a minimum auxiliary circuit capacitance.

7. The system of claim 1, wherein the auxiliary circuit comprises a first auxiliary capacitor connected between the first phase and the third phase and a second auxiliary capacitor connected between the second phase and the third phase.

8. The system of claim 7, wherein the first and second auxiliary capacitors are sized so that a DC link current caused by the auxiliary circuit cancels out a DC link current caused by the single-phase load.

9. The system of claim 8, wherein the auxiliary circuit further comprises a first damping resistor connected in parallel with the first auxiliary capacitor, and a second damping resistor connected in parallel with the second auxiliary capacitor.

10. The system of claim 1, wherein the auxiliary circuit comprises a first auxiliary capacitor connected between the first phase and an auxiliary line, a second auxiliary capacitor connected between the second phase and the auxiliary line, and a third auxiliary capacitor connected between the third phase and the auxiliary line.

11. The system of claim 10, wherein the first, second, and third auxiliary capacitors are sized so that a DC link current caused by the auxiliary circuit substantially cancels out a DC link current caused by the single-phase load.

12. The system of claim 11, wherein the auxiliary circuit further comprises a first damping resistor connected in parallel with the first auxiliary capacitor, a second damping resistor connected in parallel with the second auxiliary capacitor, and a third damping resistor connected in parallel with the third auxiliary capacitor.

13. A system for reducing low order current harmonics in a three-phase drive system receiving a three-phase source voltage and driving an unbalanced load, the system comprising:

a rectifier system connected to the three-phase source voltage;

at least one DC link inductor connected to the rectifier system;

a three-phase current source inverter connected to the at least one DC link inductor and supplying a first phase, a second phase, and a third phase;

a single-phase load connected between the first phase and the second phase; and an auxiliary circuit comprising a first auxiliary capacitor connected between the second phase and the third phase.

14. The system of claim 13, wherein the auxiliary circuit further comprises a filter capacitor connected between the first phase and the second phase.

15. The system of claim 13, wherein the auxiliary circuit further comprises a second auxiliary capacitor connected between the first phase and the third phase.

16. The system of claim 13, wherein the first auxiliary capacitor is sized so that a DC link current caused by the auxiliary circuit substantially cancels out a DC link current caused by the single-phase load and so that a rating of the three-phase current source inverter is minimized.

17. A system for reducing low order current harmonics in a three-phase drive system receiving a three-phase source voltage and driving an unbalanced load, the system comprising:

a rectifier system connected to the three-phase source voltage;

at least one DC link inductor connected to the rectifier system;

a three-phase current source inverter connected to the at least one DC link inductor and supplying a first phase, a second phase, and a third phase;

a single-phase load connected between the first phase and the second phase; and an auxiliary circuit comprising an auxiliary line, a first capacitor connected between the first phase and the auxiliary line, a second capacitor connected between the second phase and the auxiliary line and a third capacitor connected between the third phase and the auxiliary line.

18. The system of claim 16, wherein the auxiliary circuit is designed so that a DC link current caused by the auxiliary circuit substantially cancels out a DC link current caused by the one-phase load.

19. The system of claim 18, wherein the following set of equations is used to design the auxiliary circuit:

$$V_{am}I_{am} = V_m I_m$$

$$\theta = \frac{\varphi}{2} - \frac{\varphi_{au}}{2} \pm \frac{\pi}{2}$$

$$|\angle V_{au} - \angle V_o| = \left|\frac{\varphi + \varphi_{au} \mp \pi}{2}\right|$$

$$C_{au} = \frac{I_{am}}{\omega V_{am}} = \frac{I_{am}^2}{\omega V_{am} I_{am}} \geq \frac{1}{\omega V_m I_m} \cdot I_{o\max}^2 = C_{au,\min}$$

$$V_{am} = \sqrt{\omega C_{au} I_{am} V_{am}} = \sqrt{\omega C_{au} I_m V_m} \leq \max\left(\sqrt{\omega V_m I_m}\right) \cdot \sqrt{C_{au}}$$

where $V_{am}$ is an amplitude of an auxiliary circuit voltage, $I_{am}$ is an amplitude of an auxiliary circuit current, $V_m$ an amplitude of a single-phase load voltage, $I_m$ is an amplitude of a single-phase load current, $\theta$ is an angle difference between the single-phase load current and the auxiliary circuit voltage, $\varphi$ is a power factor angle between the single-phase load voltage and current, $\varphi_{au}$ is a power factor angle between the auxiliary circuit voltage and current, $V_{au}$ is an auxiliary circuit voltage, $V_o$ is a single-phase load voltage, $C_{au}$ is an auxiliary circuit capacitance, $C_{au,min}$ is a maximum auxiliary circuit capacitance, $\omega$ is a single-phase load angular speed, $I_{o\ max}$ is a maximum single-phase load current and $C_{au,min}$ is a minimum auxiliary circuit capacitance.

20. The system of claim 19, wherein the auxiliary circuit is designed so that a rating of the three-phase current source inverter is minimized.

21. The system of claim 10 wherein the auxiliary line is one of (1) only linked to the first, second and third auxiliary capacitors and (2) only linked to the first, second and third auxiliary capacitors and to the single phase load.

22. The system of claim 17 wherein the auxiliary line is one of (1) only linked to the first, second and third auxiliary capacitors and (2) only linked to the first, second and third auxiliary capacitors and to the single phase load.

* * * * *